(12) United States Patent
Koyama et al.

(10) Patent No.: US 6,413,892 B1
(45) Date of Patent: *Jul. 2, 2002

(54) GLASS SUBSTRATE FOR MAGNETIC RECORDING MEDIA

(75) Inventors: Akihiro Koyama; Nobuyuki Yamamoto, both of Osaka (JP)

(73) Assignee: Nippon Sheet Glass Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/446,264

(22) PCT Filed: Jun. 19, 1998

(86) PCT No.: PCT/JP98/02748

§ 371 (c)(1),
(2), (4) Date: Dec. 20, 1999

(87) PCT Pub. No.: WO98/58883

PCT Pub. Date: Dec. 30, 1998

(30) Foreign Application Priority Data

Jun. 20, 1997 (JP) .............................. 9-164819

(51) Int. Cl.$^7$ ........................ C03C 3/087; C03C 3/095
(52) U.S. Cl. .................... 501/64; 501/70; 501/72; 428/65.6
(58) Field of Search ......................... 501/64, 69, 70, 501/72; 428/65.6

(56) References Cited

U.S. PATENT DOCUMENTS

| 5,631,195 | A | * | 5/1997 | Yanagisawa et al. | 501/72 |
| 5,858,897 | A | * | 1/1999 | Maeda et al. | 501/70 |
| 5,888,917 | A | * | 3/1999 | Kawaguchi et al. | 501/70 |
| 5,900,296 | A | * | 5/1999 | Hayashi et al. | 501/70 |
| 5,902,665 | A | * | 5/1999 | Kuroda | 428/141 |
| 5,908,794 | A | * | 6/1999 | Maeda et al. | 501/70 |
| 5,972,460 | A | * | 10/1999 | Tachiwana et al. | 428/64.2 |
| 6,132,843 | A | * | 10/2000 | Kuroda et al. | 428/141 |

FOREIGN PATENT DOCUMENTS

| JP | 9-194229 | | 7/1997 |
| JP | 9-202641 | | 8/1997 |
| JP | 10-1329 | | 1/1998 |
| JP | 10001329 | * | 1/1998 |
| JP | 10-158038 | | 6/1998 |
| JP | 10-162354 | | 6/1998 |
| JP | 10-334813 | * | 12/1998 |
| JP | 11-199267 | * | 7/1999 |

* cited by examiner

*Primary Examiner*—David Sample
(74) *Attorney, Agent, or Firm*—Sughrue Mion, PLLC

(57) ABSTRACT

A glass substrate for magnetic recording medium, having a composition of, in % by weight: 61–70% $SiO_2$, 9–18% $Al_2O_3$, 2–4.5% $Li_2O$, 6–13% $Na_2O$, 0–5% $K_2O$, 10–16% $R_2O$ (with the proviso of $R_2O=Li_2O+Na_2O+K_2O$), 0–3.5% MgO, 1–7% CaO, 0–2% SrO, 0–2% BaO, 2–10% RO (with the proviso of RO=MgO+CaO+SrO +BaO), 0–2% $TiO_2$, 0–2% $CeO_2$, 0–2% $Fe_2O_3$, and 0–1% MnO (with the proviso of $TiO_2+CeO_2+Fe_2O_3+MnO=0.01–3\%$). The glass substrate has melting temperature and working temperature suitable for the float process, and has good water resistance and weathering resistance after tempering treatment.

13 Claims, No Drawings

GLASS SUBSTRATE FOR MAGNETIC RECORDING MEDIA

TECHNICAL FIELD

The present invention relates to a glass composition for magnetic recording medium having excellent water resistance and weather resistance, and in particular, it relates to a glass substrate for magnetic recording medium obtained by subjecting a glass blank having surface flatness and small surface warpage obtained by the float process, to tempering.

BACKGROUND ART

In general, aluminum substrates are widely used as magnetic recording medium. Thin plate is desired for the recently used substrates, and high surface flatness is desired for increasing recording density. A glass substrate is suitable as such a magnetic disk substrate, and in particular, forming this glass substrate by the float process is an advantageous method from the standpoint of the quality and cost.

If a blank with great warpage is used, the blank must be ground to correct the warpage. Because a blank formed to have high flatness by the float process does not need such correction, it is possible to produce a glass substrate for magnetic disk using a thin blank, making it possible to decrease cost for grinding.

At present, such glass substrates for magnetic recording medium are used after subjecting a glass substrate having a soda-lime glass composition, which is molded by the float process, to chemical tempering.

That is, in the glass substrates for magnetic recording medium, tempered products are mainly used., that are produced by immersing glass substrates in a molten salt containing a monovalent metal ion having an ionic radius larger than that of the monovalent metal ion contained in the glass composition to thereby exchange the metal ions in the glass for the metal ions in the molten salt.

However, problems are pointed out that if such glass substrates are subjected to a tempering treatment, weathering resistance (water resistance) deteriorates in high temperature and high humidity environment.

Further, where a glass substrate is used, thermal expansion of the glass should match that of a metal part, such as stainless steel or aluminum, which constitutes a magnetic disk drive.

U.S. Pat. No. 4,156,755 describes lithium-containing ion-exchange-reinforced glass as a tempered glass having excellent weathering resistance. This U.S. patent discloses at column 7, lines 2 to 15 a glass composition containing, in % by weight, 59–63% $SiO_2$, 10–13% $Na_2O$, 4–5.5% $Li_2O$, 15–23% $Al_2O_3$, and 2–5% $ZrO_2$, $Al_2O_3+ZrO_2$ is 19–25% by weight and $Na_2O/ZrO$ is 2.2–5.5.

For example, JP-A-62-187140 (the term "JP-A" as used herein means an "unexamined published Japanese patent application") discloses a process for producing a tempered glass. This JP-A discloses on page 1, left column, lines 5 to 16 a process for producing a tempered glass containing, in % by weight, 64–70% $SiO_2$, 14–20% $Al_2O_3$, 4–6% $Li_2O$, 7–10% $Na_2O$, 0–4% MgO and 0–1.5% $ZrO_2$.

However, the glass compositions disclosed in the examples of U.S. Pat. No. 4,156,755 and JP-A-62-187140 described above require high temperature for melting and forming, and it is not easy to produce a thin sheet having less warpage by the float process.

JP-A-5-32431 describes (on page 2, left column, lines 2 to 7) another tempered glass, and discloses a tempered glass article containing, in % by weight, 62–75% $SiO_2$, 4–12% $Na_2O$, 4–10% $Li_2O$, and 5–15% $Al_2O_3$ and 5.5–15% $ZrO_2$, wherein the weight ratio of $Na_2O/ZrO_2$ is 0.5–2.0 and the weight ratio of $Al_2O_3/ZrO_2$ is 0.4–2.5. Because the composition disclosed in the above JP-A contains a large amount of $ZrO_2$, crystals of $ZrO_2$ tend to precipitate in a furnace in the case of producing using a melting furnace, and there was a problem on quality. That is, when a blank in which crystals of $ZrO_2$ were precipitated is ground and polished to produce a magnetic disk substrate, $ZrO_2$ crystals that are hardly polished off remain on the surface as projections and cause a head crush.

JP-B-47-1312 (the term "JP-B" as used herein means an "examined published Japanese patent application") discloses lithium or sodium aluminosilicate glass as a tempered glass plate suitable as a wind-screen of, for example, automobiles or aircraft and a process for producing the same. There is the disclosure on page 3, right column, lines 29–34 that particularly preferred glass is that its inner part comprises, on the weight of oxide basis, 2–6% $LiO_2$, 5–10% $Na_2O$, 15–25% $Al_2O_3$ and 60–70% $SiO_2$, with the sum of $Li_2O$, $Na_2O$, $Al_2O_3$ and $SiO_2$ being at least 95% by weight of the composition. The Example fallen in the above composition range, described in 3 in Table 1 of column 3 of the above JP-B needs high temperature for melting and forming and it is difficult to produce a high quality glass by the float process.

British Patent 1,322,510 discloses METHOD OF STRENGTHENING A GLASS ARTICLE AND A STRENGTHENED GLASS ARTICLE. One object of the patent is to provide a composition that can produce a glass sheet by Froucault process, Pennvernon or Pittsburgh process, Colburn process (page 1, lines 61–75), and there is the description as conditions for a glass composition therefor that a strain point is 450–550° C., a working temperature is 980–1,150° C. and a liquidus temperature is 1,100° C. or lower. The composition described the British patent had the problems that the working temperature is high, the liquidus temperature is higher than the working temperature so that the composition is not suitable for forming into a thin plate with little warpage by the float process, and weathering resistance of the resulting tempered glass is poor.

Further, in aiming at the improvement of recording density in a magnetic disk substrate, there is a tendency to further decrease a distance between a substrate and a magnetic head, and then the cleanness of the surface of a substrate has become an issue. If any foreign matter is adhered to the surface of a substrate, the head strike against the foreign in reading and writing, causing head crush. To avoid this, the demand for cleanness of the substrate surface has been increasing. Washing with acid is an effective for the improvement of the cleanness. $H_2SO_4$, HF, $NHO_3$ or the like is used the acid, and HF and $H_2SO_4$ are particularly effective.

If glass having poor acid resistance is washed with acid, latent scratch generates. On the other hand, glass having acid resistance more than necessary requires a concentrated acid for washing, and this results in problems on cost, on working, on environment and in waste treatment. An acid concentration suitable for washing is about 0.002–0.3% HF and about 1–20% for $H_2SO_4$.

JP-A-62-187140 supra has the description at column 3, upper right column, lines 3–6 that "Because reinforced glass having an extremely deep compression stress layer can be obtained with ease, the resulting reinforced glass can be used as a disk substrate that is required to have high reliability in strength". Evaluation on resistance against 0.5% $H_2SO_4$ is made as the example. However, such is not evaluation for latent scratch by washing, but is evaluation that intends weathering resistance. There is no mention of HF resistance.

Accordingly, an object of the present invention is to provide a glass substrate for magnetic recording medium, that does not substantially contain $ZrO_2$ which becomes a problem in the production using a melting furnace, has good water resistance or weathering resistance after tempering treatment and comprises a composition that has a melting temperature and a working temperature suitable for forming into a thin plate with little warpage by the float process.

The present invention further has an object to provide a glass substrate for magnetic recording medium, which has a coefficient of thermal expansion that makes it possible to use the substrate in combination with a metal article. The present invention also has an object to provide a glass substrate for magnetic recording medium, which is difficult to cause latent scratch in washing with an acid, particularly in using $H_2SO_4$ or HF.

DISCLOSURE OF THE INVENTION

The present invention has been made based on the above-described problems and demands in the prior art.

The present invention provides a tempered glass substrate for magnetic recording medium, that has a composition of, in % by weight:
61–70% $SiO_2$,
9–18% $Al_2O_3$,
2–4.5% $Li_2O$,
6–13% $Na_2O$,
0–5% $K_2O$,
10–16% $R_2O$
(with the proviso of $R_2O=Li_2O+Na_2O+K_2O$),
0–3.5% MgO,
1–7% CaO,
0–2% SrO,
0–2% BaO,
2–10% RO
(with the proviso of RO=MgO+CaO+SrO+BaO),
0–2% $TiO_2$,
0–2% $CeO_2$,
0–2% $Fe_2O3$, and
0–1% MnO,
with the proviso of $TiO_2+CeO_2+Fe_2O_3+MnO=0.01-3\%$, does not substantially contain $ZrO_2$, and has water resistance such that the sum of glass components eluted in a purified water when it is maintained in purified water at 60° C. for 120 hours is 1 $\mu g/cm^2$ or less.

BEST MODE FOR PRACTICING THE INVENTION

The particularly preferred embodiments are as follows.
a) The glass substrate in which an average coefficient of linear thermal expansion in a temperature range of 50–350° C. is $80 \times 10^{-7}$/K or more;
b) The tempered glass substrate for magnetic recording medium, that has a composition of, in % by weight:
62–69% $SiO_2$,
9–13.5% $Al_2O_3$,
2–4.5% $Li_2O$,
7.5–12.5% $Na_2O$,
0–2% $K_2O$,
10–15% $R_2O$
(with the proviso of $R_2O=Li_2O+Na_2O+K_2O$),
0–3.5% MgO,
2.5–6% CaO,
0–2% SrO,
0–2% BaO,
3–9% RO
(with the proviso of RO=MgO+CaO+SrO+BaO),
0–2% $TiO_2$,
0–2% $CeO_2$,
0–2% $Fe_2O_3$, and
0–1% MnO,
with the proviso of $TiO_2+CeO_2+Fe_2O_3+MnO=0.01-3\%$, does not substantially contain $ZrO_2$, and has water resistance such that the sum of glass components eluted in a purified water when it is maintained in purified water at 60° C. for 120 hours is 1 $\mu g/cm^2$ or less;
c) The glass substrate in which an average coefficient of linear thermal expansion in a temperature range of 50–350° C. is $84 \times 10^{-7}$/K or more;
d) The glass substrate for magnetic recording medium, in which a melting temperature (temperature having a viscosity of 10 poise) of the glass composition is 1,550° C. or lower, a working temperature (temperature having a viscosity of $10^4$ poise) is 1,100° C. or lower, and a liquidus temperature is the working temperature or lower;
e) The glass substrate for magnetic recording medium, in which a melting temperature (temperature having a viscosity of $10^2$ poise) of the glass composition is 1,540° C. or lower, a working temperature (temperature having a viscosity of $10^4$ poise) is 1,055° C. or lower, and a liquidus temperature is the working temperature or lower; and
f) The tempered glass substrate for a magnetic recording medium, characterized in that the Li ion and/or the Na ion in the vicinity of the surface of the glass substrate. are substituted with a monovalent metal ion having ionic radius greater than that of the Li ion so that the glass substrate has a compression stress in the vicinity of the surface thereof.

The reasons for limiting the composition of the glass substrate for magnetic recording medium according to the present invention are explained below.

$SiO_2$ is a main component for consisting a glass and is an essential structural component. If the proportion is less than 61%, water resistance after ion exchange deteriorates and also acid resistance deteriorates. On the other hand, if it exceeds 70%, the viscosity of molten glass is too high, so that it is difficult to melt and mold and also the coefficient of thermal expansion becomes too small. For this reason, the $SiO_2$ range is preferably 61–70%, and more preferably 62–69%.

$Al_2O_3$ is an essential structural component for increasing the rate of ion exchange and improving water resistance after ion exchange. If the proportion is less than 9%, its effect is not sufficient. On the other hand, if it exceeds 18%, the viscosity of molten glass is too high, so that it is difficult to melt and mold and also the coefficient of thermal expansion becomes too small. Further, acid resistance deteriorates. For this reason, the $Al_2O_3$ range is preferably 9–18%. In order to further increase the acid resistance, 9–13.5% is preferable.

$Li_2O$ is an essential structural component for conducting ion exchange and is also a component to improve melting property. If its proportion is less than 2%, surface compression stress after ion exchange is not sufficiently obtained, and further, melting property is poor. On the other hand, if it exceeds 4.5%, the water resistance after ion exchange deteriorates, and also the liquidus temperature rises, making it difficult to mold. For this reason, the $Li_2O$ range is preferably 2–4.5%.

$Na_2O$ is a component to improve melting property. If its proportion is less than 6%, its effect is insufficient. On the other hand, if it exceeds 13%, the water resistance after ion exchange deteriorates. For this reason, the $Na_2O$ range is preferably 6–13%, more preferably 7.5–12.5%.

$K_2O$ is a component to improve melting property but is not an essential component because it decreases the surface compression stress after ion exchange. For this reason, the $K_2O$ range is preferably 5% or less, more preferably 2% or less.

If the total $R_2O$ of $Li_1O+Na_2O+K_2O$ is less than 10%, the viscosity of molten glass is too high, so that it is difficult to melt and form and also the coefficient of thermal expansion becomes too small. On the other hand,if it exceeds 16%, the water resistance after ion exchange deteriorates. For this reason, the total $R_2O$ range of $Li_1O+Na_2O+K_2O$ is preferably 10–16%, more preferably 10–15%.

MgO is a component for improving melting property. If it exceeds 3.5%, the liquidus temperature elevates, making it difficult to form. For this reason, MgO is preferably 3.5% or less, more preferably 0.5–3%.

CaO is a component for improving melting property and is also an essential component for controlling the rate of ion exchange. If its proportion is less than 1%, its effect is not sufficient. On the other hand, if it exceeds 7%, the liquidus temperature raises, making it difficult to form. For this reason, the CaO range is preferably 1–7%, more preferably 2.5–6%.

SrO and BaO are components for improving melting property and also components effective to lower the liquidus temperature. However, the glass density increases and those lead to an increase of material cost. Therefore, SrO and BaO each are preferably 2% or less, more preferably 1% or less.

If the total RO of MgO+CaO+SrO+BaO is less than 2%, the viscosity-of molten glass is too high, so that it is difficult to melt and form. If it exceeds 10%, the liquidus temperature raises, making it difficult to form. For this reason, the total RO of MgO+CaO+SrO+BaO is preferably 2–10%, more preferably 3–9%.

$Fe_2O_3$ is that $Fe^{2+}$ and $Fe^{3+}$ are in an equilibrium state in a glass melt. Those ions greatly influence light transmission, especially infrared light transmission, in the melt. If the total iron exceeds 2% in terms of $Fe_2O_3$, absorption in the infrared region is too large, and the temperature distribution during melting or forming cannot be controlled, leading to deterioration in quality. For this reason, the total iron is preferably 2% or less in terms of $Fe_2O_3$.

$TiO_2$, $CeO_2$ and MnO are effective components to change the equilibrium between $Fe^{2+}$ and $Fe^{3+}$ and also change light transmission of light by interaction. However, If those contain in excess, the blank quality deteriorates and also material cost increases. Therefore, the $TiO_2$ range is preferably 3% or less, more preferably 2% or less, and the $CeO_2$ range is preferably 2% or less, more preferably 1% or less. Further, the MnO range is preferably 1% or less.

The glass substrate for magnetic recording medium of the present invention can further contain, other than the above components, coloring materials such as NiO, $Cr_2O_3$ or CoO, and refining agents such as $SO_3$, $As_2O_3$ or $Sb_2O_3$, in a range that the characteristic of the present invention is not impaired.

Of those, $SO_3$ has its origin in a sulfate used as a refining agent. Where the sulfate is used as a refining agent, if the residual amount in the glass is less than 0.05%, a refining effect is not sufficient. On the other hand, even if the residual amount exceeds 0.5%, the refining effect is equivalent, and further $SO_x$ contained in a waste gas in melting glass increases, which is unfavorable to the environment. For this reason, $SO_3$ remained in glass is preferably 0.05–0.5%.

$As_2O_3$ or $Sb_2O_3$ that is commonly used as a refining agent is preferably 1% or less in view of their toxicity, and the amount thereof is desirably not higher than the amount contaminated from impurities, i.e., 0.1% or less.

$B_2O_3$, ZnO, $P_2O_5$, PbO, etc., which are highly volatile, corrode bricks of a glass melting furnace, and the volatile components gather on the ceiling of the furnace and fall down on the glass together with the bricks to deteriorate the glass quality. Therefore, the amount of those oxides are preferably not higher than the amount contaminated from impurities, i.e., 0.1% or less.

$ZrO_2$ crystallizes during melting in a furnace. Where a blank containing such crystals is ground and polished to produce a magnetic disk substrate, $ZrO_2$ crystals that are difficult to polish form projections on the surface of the substrate, causing a head crush. Therefore, $ZrO_2$ is not substantially contained, except for impurities and one melted from the furnace material. However, impurities and that melted from the furnace material may contain in an amount of about 0.5% or less.

A magnetic disk glass substrate can be prepared by subjecting the glass blank having the composition as described in the claims of the present invention to a disk processing, followed by rough polishing, tempering and precise polishing. In this case, matching of a coefficient of expansion with a metal-made fixture such as stainless steel or aluminum is necessary. In this case, an average coefficient of linear thermal expansion in a temperature range of 50–350° C. is preferably $80 \times 10^{-7}$/K or more, and further $84 \times 10^{-7}$/K or more is desirable.

For melting high quality glass, viscosity of the glass is that a melting temperature, that is, a temperature having a viscosity of $10^2$ poise, is preferably 1,550° C. or lower, and more preferably 1,540° C. or lower. In order to form into a sheet having high flatness, particularly to form by the float process, it is preferable that a working temperature, that is, a temperature having a viscosity of $10^4$ poise, is 1,100° C. or lower and a liquidus temperature is not higher than the working temperature. Further, in order to form a thin plate having further decreased warpage, it is desirable that a working temperature is 1,055° C. or lower and a liquidus temperature is not higher than the working temperature.

The tempering treatment using the above glass blank is that the glass substrate for magnetic recording medium of the present invention is maintained with a metal holder, pre-heated to 200–300° C., and then dipped in a molten salt of an ion-exchange tank. The treatment temperature is 350–460° C., and the treatment time is 0.5–8 hours. After the ion exchange treatment, the glass is taken out of the molten salt, cooled, washed with hot water, washed with water, and then dried. The molten salt used is $NaNO_3$ salt, $KNO_3$ salt or their mixed salt.

The tempered glass substrate for magnetic recording medium of the present invention has a surface stress of at least 10 kg/mm², so that it is difficult to form scratch on the substrate surface and also the substrate is difficult to break.

The glass substrate for magnetic recording medium requires storage stability for a long period of time, and water resistance (elution resistance of glass components from glass surface due to moisture) which is one evaluation of weathering resistance which withstands use under bad environment, i.e., high temperature and high humidity.

If the total amount of glass components eluted in water exceeds 1 $\mu g/cm^2$, precipitates of eluted alkali plus carbonate may be formed on the surface of the glass substrate for magnetic recording medium during storage. In a magnetic recording medium which is film-formed while retaining the precipitates, head of a magnetic disk contacts with the precipitates and is worn, shortening life of the head. Further, the head strikes against the precipitates, causing head crush. Furthermore, in a magnetic disk medium using a glass substrate for magnetic recording medium having a poor water resistance, water permeates between the glass substrate and a film from the edge portion, causing white fog which one kind of discoloration, and this may be a problem on product. Therefore, the total amount of glass components eluted is preferably 1 $\mu g/cm^2$ or less.

Where a glass substrate for magnetic recording medium having poor acid resistance is washed with an. acid, latent scratch are produced. If a magnetic film is formed on such a glass substrate for magnetic recording medium having latent scratch, the magnetic film is not completely adhered at the latent scratch-produced portion and such a disk cannot read and write, causing error. For this reason, the number of latent scratch on the surface of the glass substrate for magnetic recording medium is preferably $3/mm^2$ or less, more preferably $1/mm^2$, when visually observed with an optical microscope with a magnification of 200.

EXAMPLE

Compositions that are 8 kinds of examples in the present invention and properties of glasses are shown in Table 1 and Table 2.

TABLE 1

Compositions and properties of each example

| | Example | | | |
|---|---|---|---|---|
| | 1 | 2 | 3 | 4 |
| Composition (wt %) | | | | |
| $SiO_2$ | 61.5 | 62.5 | 63.0 | 63.1 |
| $ZrO_2$ | | | | |
| $Al_2O_3$ | 16.3 | 16.3 | 16.3 | 16.3 |
| $Li_2O$ | 3.7 | 3.7 | 3.7 | 3.7 |
| $Na_2O$ | 10.6 | 10.6 | 10.6 | 10.6 |
| $K_2O$ | 0.6 | 0.3 | 0.4 | 0.4 |
| MgO | 2.3 | 2.1 | 1.9 | 1.7 |
| CaO | 4.6 | 4.2 | 3.8 | 3.4 |
| SrO | | | | |
| BaO | | | | |
| $TiO_2$ | 0.02 | 0.02 | 0.02 | 0.02 |
| $Fe_2O_3$ | 0.08 | 0.08 | 0.08 | 0.08 |
| $CeO_2$ | | | | 0.5 |
| MnO | 0.10 | | | |
| $Sb_2O_3$ | | | | |
| $SO_3$ | 0.20 | 0.21 | 0.21 | 0.21 |
| $R_2O^*$ | 14.9 | 14.6 | 14.7 | 14.7 |
| $RO^{**}$ | 6.9 | 6.3 | 5.7 | 5.1 |
| Total | 100.0 | 100.0 | 100.0 | 100.0 |
| Properties | | | | |
| Melting point (° C.) | 1487 | 1500 | 1522 | 1538 |
| Working temperature TW (° C.) | 1014 | 1023 | 1039 | 1042 |
| Strain point (° C.) | 473 | 467 | 469 | 468 |
| Liquidus temperature (° C.) | 990 | 969 | 1002 | 988 |
| TW-TL (° C.) | 24 | 54 | 37 | 54 |
| Coefficient of expansion × $10^{-7}$ $(K^{-1})$ | 91 | 90 | 90 | 91 |

TABLE 1-continued

Compositions and properties of each example

| | Example | | | |
|---|---|---|---|---|
| | 1 | 2 | 3 | 4 |
| Occurrence of latent scratch after washing | | | | |
| HF concentration 0.1% | Δ | Δ | Δ | Δ |
| 0.01% | ○ | ○ | ○ | ○ |
| Water resistance after I/E | | | | |
| Total elution amount ($\mu g/cm^2$) | 0.7 | 0.6 | 0.7 | 0.6 |
| Depth of stress layer ($\mu m$) | 60 | 62 | 62 | 58 |
| Stress ($kg/mm^2$) | 14 | 16 | 13 | 18 |

*$R_2O = Li_2O + Na_2O + K_2O$
**$RO = MgO + CaO + SrO + BaO$
○: Number of latent scratch $0-1/mm^2$
Δ: Number of latent scratch $2-3/mm^2$
X: Number of latent scratch 4 or more/$mm^2$

TABLE 2

Compositions and properties of each example

| | Example | | | |
|---|---|---|---|---|
| | 5 | 6 | 7 | 8 |
| Composition (wt %) | | | | |
| $SiO_3$ | 64.2 | 61.9 | 67.3 | 68.4 |
| $ZrO_2$ | | | | |
| $Al_2O_3$ | 17.2 | 15.7 | 9.2 | 13.4 |
| $Li_2O$ | 4.1 | 4.3 | 2.1 | 2.8 |
| $Na_2O$ | 9.2 | 10.6 | 11.7 | 11.3 |
| $K_2O$ | 0.4 | 1.2 | 0.7 | 0.2 |
| MgO | 0.6 | 3.0 | 2.6 | 2.5 |
| CaO | 2.2 | 3.1 | 5.2 | 1.2 |
| SrO | 1.0 | | | |
| BaO | 0.4 | | | |
| $TiO_2$ | 0.12 | | 1.0 | |
| $Fe_2O_3$ | 0.38 | | | |
| $CeO_2$ | | | | |
| MnO | | | | |
| $Sb_2O_3$ | | | | |
| $SO_3$ | 0.21 | 0.20 | 0.21 | 0.21 |
| $R_2O^*$ | 13.7 | 16.1 | 14.5 | 14.3 |
| $RO^{**}$ | 4.2 | 6.1 | 7.8 | 3.7 |
| Total | 100.0 | 100.0 | 100.0 | 100.0 |
| Properties | | | | |
| Melting point (° C.) | 1521 | 1475 | 1536 | 1548 |
| Working temperature TW (° C.) | 1049 | 1009 | 1039 | 1052 |
| Strain point (° C.) | 471 | 456 | 488 | 502 |
| Liquidus temperature (° C.) | 973 | 997 | 1022 | 1020 |
| TW-TL (° C.) | 76 | 12 | 17 | 32 |
| Coefficient of expansion × $10^{-7}$ $(K^{-1})$ | 95 | 87 | 85 | 86 |
| Occurrence of latent scratch after washing | | | | |
| HF concentration 0.1% | X | Δ | ○ | ○ |
| 0.01% | ○ | ○ | ○ | ○ |
| Water resistance after I/E | | | | |
| Total elution amount ($\mu g/cm^2$) | 0.8 | 0.9 | 0.8 | 0.7 |
| Depth of stress layer ($\mu m$) | 70 | 64 | 54 | 59 |
| Stress ($kg/mm^2$) | 21 | 15 | 11 | 12 |

*$R_2O = Li_2O + Na_2O + K_2O$
**$RO = MgO + CaO + SrO + BaO$
○: Number of latent scratch $0-1/mm^2$
Δ: Number of latent scratch $2-3/mm^2$
X: Number of latent scratch 4 or more/$mm^2$ Example 1 is explained. A glass batch having the composition shown in Table 1 was prepared using silica, alumina, lithium carbonate, sodium carbonate, basic magnesium carbonate, calcium carbonate, potassium carbonate, sodium sulfate and the like that are general glass materials. The batch thus prepared was melted in a platinum crucible at 1,450° C. for 4 hours, and was cast on an iron plate. This glass was maintained in an electric furnace at 500° C. for 30 minutes. The electric furnace was switched off to cool the glass to room temperature to prepare a glass sample.

Measurement results of melting temperature (a temperature at log η=2), working temperature (TW: a temperature at log η=4), liquidus temperature (TL), difference between the working temperature and the liquidus temperature (TW-TL) and strain point (a temperature at log η=14.5) are shown in Table 1 as the properties of the glass.

The viscosity at high temperature region was measured with an automatic recording draw sphere type viscometer using a platinum ball, and the strain point was measured with a beam-bending type viscometer.

The liquidus temperature was measured as follows. A glass sample was crushed and passed through a sieve of 2,380 μm and then through a sieve of 1,000 μm. The glass particles remaining on the sieve of 1,000 μm were immersed in ethanol, washed by ultrasonication, and dried in a thermostat. The thus treated glass particles weighing 25 g were put in a platinum boat of 12 mm in width, 200 mm in length and 10 mm in depth so as to have an almost constant thickness. The boat and the contents were placed in a gradient furnace of 900–1,150° C. for 2 hours. After taking out of the furnace, devitrification occurred in the glass inside was observed with an optical microscope of 40 magnifications. The highest temperature at which devitrification occurred was taken as a liquidus temperature.

State (number) of occurrence of latent scratch after acid washing is shown in Table 1. The sample glass was cut into a doughnut of 65 mm outer diameter ×20 mm inner diameter, and mirror polished (surface roughness Ra: 2 nm or less; JIS B 0601-1994) to form a plate having a thickness of 0.635 mm. This disk was dipped in 0.1% HF and 0.01% HF, respectively, for 3 minutes. After washing with water and drying, the number of occurrence of latent scratch was visually confirmed using an optical microscope (magnification: 200).

Measurement results of surface stress, depth of the surface stress layer and water resistance after the ion exchange are shown in Table 1 as the properties after ion exchange. The ion exchange was conducted such that the glass was immersed in a mixed molten salt of 40% of sodium nitrate of first class grade and 60% of potassium nitrate of first class grade and maintained therein at 380° C. for 1 hour. A slice of the ion-exchanged glass was prepared and the surface stress and the depth of the surface stress layer were measured using a polarizing microscope.

The sample glass was cut into a doughnut of 65 mm outer diameter ×200 mm inner diameter. This disk was ion-exchanged and then mirror-polished (surface roughness Ra: 2 nm or less; JIS B 0601-1994) to prepare a plate having a thickness of 0.635 mm. This plate was put in a vinyl bag together with 20 ml of purified water (ion-exchanged water) and maintained at 60° C. for 120 hours. The amount of glass components eluted in purified water was measured. Water resistance was determined as an elution amount per unit area.

Measurement method of elution amount:
  Alkali content (Li, Na, k, etc.): Flame method
  Silica content: Weight method
  Other components (Ca, Mg, Sr, Ba, Al, Ti, Fe, etc.):
    Plasma emission spectral analysis In Examples 2–8, glass samples were prepared in the same manner as in Example 1, and properties of glasses, the number of occurrence of latent scratch in washing and properties after ion-exchange were measured in the same manner as in Example 1.

In each of the Examples, a glass composition having a melting temperature of 1,550° C. or lower, a working temperature of 1,100° C. or lower and a liquidus temperature of not higher than the respective working temperature was obtained. Therefore, it was proved that this glass composition has less devitrification and occurrence of striae, a high quality glass is obtained and melting property and forming property are excellent. Further, it was confirmed that the glass composition can be formed by the float process. Further, since $ZrO_2$ is, as a matter of course, not contained, crystals of $ZrO_2$ do not precipitate.

It was proved that the weight loss in water resistance after the ion exchange is very excellent as 1 $\mu g/cm^2$ or less.

In the glass compositions wherein the $Al_2O_3$ content was 13.5% or less, latent scratch was not observed at all in both 0.1% HF and 0.01% HF, but in the glass compositions wherein the $Al_2O_3$ content was higher than that, latent scratch was slightly observed in 0.1% HF.

A magnetic disk medium was prepared using the glass substrate for magnetic recording medium prepared above. The preparation of the medium was conducted by a sputtering method.

The glass substrate for magnetic recording medium after polishing was precisely washed with 0.02% HF or 5% $H_2SO_4$. Latent scratch did not occur on the substrate after washing.

Cr, Co—Cr—Ta, and C were successively formed on the substrate by sputtering as a subbing layer, a recording layer, and a protective layer, respectively. Further, a lubricating layer was formed thereon to obtain a magnetic disk medium. The medium thus obtained was mounted on a closed system magnetic disk drive and continuously run. In this case, the temperature inside the drive increased due to the heat generated from the motor and the friction of the disk surface with air, but no trouble arose due to the matched coefficient of thermal expansion with the metal-made fixture.

COMPARATIVE EXAMPLE

On the other hand, compositions of 6 kinds of comparative examples that are not included in the present invention and properties of glasses are shown in Table 3 and Table 4.

TABLE 3

Compositions and properties of each comparative example

| | Comparative Example | | | |
|---|---|---|---|---|
| | 1 | 2 | 3 | 4 |
| Composition (wt %) | | | | |
| $SiO_2$ | 61.9 | 65.5 | 66.0 | 72.3 |
| $ZrO_2$ | 4.0 | 1.0 | 6.0 | |
| $Al_2O_3$ | 18.1 | 17.0 | 13.0 | 1.4 |
| $Li_2O$ | 5.0 | 5.0 | 8.0 | |
| $Na_2O$ | 11.0 | 8.5 | 5.0 | 13.1 |
| $K_2O$ | | | | 0.7 |
| MgO | | 3.0 | | 4.1 |
| CaO | | | | 8.1 |
| SrO | | | | |
| BaO | | | | |
| $TiO_2$ | | | | |
| $Fe_2O_3$ | | | | 0.1 |

TABLE 3-continued

Compositions and properties of each comparative example

| | Comparative Example | | | |
|---|---|---|---|---|
| | 1 | 2 | 3 | 4 |
| $CeO_2$ | | | | |
| MnO | | | | |
| $Sb_2O_3$ | | | | |
| $SO_3$ | | | | 0.2 |
| $R_2O$* | 16.0 | 13.5 | 13.0 | 13.8 |
| RO** | 0.0 | 3.0 | 0.0 | 12.2 |
| Total | 100.0 | 100.0 | 100.0 | 100.0 |
| Properties | | | | |
| Melting point (° C.) | 1615 | 1590 | 1510 | 1488 |
| Working temperature TW (° C.) | 1089 | 1095 | 1054 | 1047 |
| Strain point (° C.) | 480 | 482 | 483 | 500 |
| Liquidus temperature (° C.) | 924 | 988 | 1086 | 1015 |
| TW-TL (° C.) | 165 | 107 | −32 | 32 |
| Coefficient of expansion × $10^{-7}$ $(K^{-1})$ | 100 | 92 | 93 | 88 |
| Occurrence of latent scratch after washing | | | | |
| HF concentration 0.1% | X | X | ○ | Δ |
| 0.01% | X | X | ○ | ○ |
| Water resistance after I/E | | | | |
| Total elution amount ($\mu g/cm^2$) | 0.9 | 0.7 | 1.1 | 19.8 |
| Depth of stress layer ($\mu m$) | 210 | 159 | 167 | 11.7 |
| Stress ($kg/mm^2$) | 33 | 36 | 59 | 66 |

*$R_2O$ = $Li_2O$ + $Na_2O$ + $K_2O$
**RO = MgO + CaO + SrO + BaO
○: Number of latent scratch 0–1/$mm^2$
Δ: Number of latent scratch 2–3/$mm^2$
X: Number of latent scratch 4 or more/$mm^2$

TABLE 4

Compositions and properties of each comparative example

| | Comparative Example | |
|---|---|---|
| | 5 | 6 |
| Composition (wt %) | | |
| $SiO_2$ | 55.2 | 68.7 |
| $ZrO_2$ | | |
| $Al_2O_3$ | 18.6 | 8.3 |
| $Li_2O$ | 6.4 | 0.7 |
| $Na_2O$ | 10.0 | 16.7 |
| $K_2O$ | 0.6 | |
| MgO | 3.1 | 1.8 |
| CaO | 6.1 | 3.8 |
| SrO | | |
| BaO | | |
| $TiO_2$ | | |
| $Fe_2O_3$ | | |
| $CeO_2$ | | |
| MnO | | |
| $Sb_2O_3$ | | |
| $SO_3$ | | |
| $R_2O$* | 16.4 | 17.4 |
| RO** | 9.2 | 5.6 |
| Total | 100.0 | 100.0 |
| Properties | | |
| Melting point (° C.) | 1492 | 1512 |
| Working temperature TW (° C.) | 1021 | 1056 |
| Strain point (° C.) | 466 | 472 |
| Liquidus temperature (° C.) | 1087 | 1048 |
| TW-TL (° C.) | −66 | 8 |
| Coefficient of expansion × $10^{-7}$ $(K^{-1})$ | 93 | 98 |
| Occurrence of latent scratch after washing | | |
| HF concentration 0.1% | X | ○ |
| 0.01% | X | ○ |
| Water resistance after I/E | | |
| Total elution amount ($\mu g/cm^2$) | 1.8 | 2.7 |
| Depth of stress layer ($\mu m$) | 72 | 49 |
| Stress ($kg/mm^2$) | 23 | 8 |

*$R_2O$ = $Li_2O$ + $Na_2O$ + $K_2O$
**RO = MgO + CaO + SrO + BaO
○: Number of latent scratch 0–1/$mm^2$
Δ: Number of latent scratch 2–3/$mm^2$
X: Number of latent scratch 4 or more/$mm^2$ Comparative Examples 1–6 are the compositions that are not fallen in the scope of claims. Sample glasses were prepared in the same manner as in Example 1. The characteristics of the glasses, the number of occurrence of latent scratch in washing and the characteristics after ion exchange were measured in the same manner as in Example 1, except that the ion exchange was carried out by immersing the glass in a mixed molten salt of 40% of sodium nitrate of first class grade and 60% of potassium nitrate of first class grade and maintaining therein at 380° C. for 3 hours.

Comparative Example 1 has the composition described in Example 18 of U.S. Pat. No. 4,156,755. Since a melting temperature is high as 1,615° C., it was not easy to produce a high quality glass having less occurrence of devitrification or striae. Further, occurrence of latent scratch was observed.

Comparative Example 2 has the composition described in Example 1 of JP-A-62-187140. Since a melting temperature is high as 1,590° C. or higher, it was not easy to produce a high quality glass having less occurrence of devitrification or striae Further, occurrence of latent scratch was observed.

Comparative Example 3 has the composition specified in Example 4 of JP-A-5-32431. Since a liquidus temperature is higher than the working temperature, it is difficult to form the composition into a glass.

Comparative Example 4 is the above-described commercially available soda-lime glass. A sample glass was prepared in the same manner as in Example 1, and the characteristics of the glass and the characteristics after ion exchange were measured. However, the ion-exchange was carried out by immersing the glass in a molten salt of potassium nitrate of first class grade and maintaining therein at 470° C. for 3 hours. The weight loss in the water resistance test after ion-exchange was 20 $\mu g/cm^2$. This was more than 20 times the elution in the examples of the present invention, and thus water resistance was poor.

Comparative Example 5 is a composition having the liquidus temperature higher than the working temperature, and it is difficult to mold the composition into a glass. Further, since latent scratch occurs by dipping in HF, HF washing cannot be conducted where it is used as a magnetic disk substrate, and improvement in surface cleanness is not expected. Further, water resistance after tempering was poor.

Comparative Example 6 is the composition having the liquidus temperature lower than the working temperature.

Further, latent scratch does not occur by dipping in HF, but water resistance after tempering was poor.

Industrial Applicability

As described above, the glass substrate for magnetic recording medium of the present invention has good water resistance and also excellent weathering resistance. Further, since acid resistance is good, so that precise washing is possible even in an acid washing and occurrence of latent scratch is less, a very high quality magnetic disk medium having less occurrence of discoloration such as head crush or while fogging can be produced.

Further, according to the glass substrate for magnetic recording medium of the present invention, it is possible to match a coefficient of expansion with metal parts.

Because the composition for magnetic recording medium of the present invention has a liquidus temperature lower than the working temperature, and exhibits excellent melting property and forming property, it is possible to produce the substrate by the float process. Accordingly, the present invention makes it possible to produce a high quality glass substrate for magnetic recording medium using a glass blank having a high flatness that is a characteristic of the float process.

What is claimed is:

1. A glass substrate for magnetic recording medium, wherein the glass substrate has a composition of, in % by weight:
   61–70% $SiO_2$,
   9–18% $Al_2O_3$,
   2–4.3% $Li_2O$,
   6–13% $Na_2O$,
   0–5% $K_2O$,
   10–16% $R_2O$
   with the proviso of $R_2O=Li_2O+Na_2O+K_2O$,
   0–3.5% MgO,
   1–7% CaO,
   0–2% SrO,
   0–2% BaO,
   2–10% RO
   with the proviso of RO=MgO+CaO+SrO+BaO,
   0–2% $TiO_2$,
   0–2% $CeO_2$,
   0–2% $Fe_2O_3$, and
   0–1% MnO,
   with the proviso of $TiO_2+CeO_2+Fe_2O_3+MnO=0.01–3\%$, does not substantially contain $ZrO_2$, has water resistance such that the sum of glass components eluted in a purified water when it is maintained in purified water at 60° C. for 120 hours is 1 $\mu g/cm^2$ or less, and is tempered.

2. The glass substrate for magnetic recording medium as claimed in claim 1, wherein an average coefficient of linear thermal expansion in a temperature range of 50–350° C. is 80×10$^{-7}$/K or more.

3. The glass substrate for magnetic recording medium as claimed in claim 1, which has a composition of, in % by weight:
   62–69% $SiO_2$,
   9–13.5% $Al_2O_3$,
   2–4.3% $Li_2O$,
   7.5–12.5% $Na_2O$,
   0–2% $K_2O$,
   10–15% $R_2O$
   with the proviso of $R_2O=Li_2O+Na_2O+K_2O$,
   0.5–3.5% MgO,
   2.5–6% CaO,
   0–2% SrO,
   0–2% BaO,
   3–9% RO
   with the proviso of RO=MgO+CaO+SrO+BaO,
   0–2% $TiO_2$,
   0–2% $CeO_2$,
   0–2% $Fe_2O_3$, and
   0–1% MnO,
   with the proviso of $TiO_2+CeO_2+Fe_2O_3+MnO=0.01–3\%$.

4. The glass substrate for magnetic recording medium as claimed in any one of claims 1 to 3, wherein an average coefficient of linear thermal expansion in a temperature range of 50–350° C. is 84×10$^{-7}$/K or more.

5. The glass substrate for magnetic recording medium as claimed in claim 4, wherein the glass substrate is a substrate formed by a float process.

6. The glass substrate for magnetic recording medium as claimed in claim 4, wherein the melting temperature (temperature having a viscosity of $10^2$ poise) of the glass composition is 1,550° C. or lower, the working temperature (temperature having a viscosity of $10^4$ poise) is 1,100° C. or lower, and the liquidus temperature is the working temperature or lower.

7. The glass substrate for magnetic recording medium as claimed in claim 6, wherein the melting temperature (temperature having a viscosity of $10^2$ poise) of the glass composition is 1,540° C. or lower, the working temperature (temperature having a viscosity of $10^4$ poise) is 1,055° C. or lower, and the liquidus temperature is the working temperature or lower.

8. The glass substrate for magnetic recording medium as claimed in any one of claims 1 to 3, wherein the glass substrate is a substrate formed by a float process.

9. The glass substrate for magnetic recording medium as claimed in claim 8, wherein the melting temperature (temperature having a viscosity of $10^2$ poise) of the glass composition is 1,550° C. or lower, the working temperature (temperature having a viscosity of $10^4$ poise) is 1,100° C. or lower, and the liquidus temperature is the working temperature or lower.

10. The glass substrate for magnetic recording medium as claimed in claim 9, wherein the melting temperature (temperature having a viscosity of $10^2$ poise) of the glass composition is 1,540° C. or lower, the working temperature (temperature having a viscosity of $10^4$ poise) is 1,055° C. or lower, and the liquidus temperature is the working temperature or lower.

11. The glass substrate for magnetic recording medium as claimed in any of claims 1 to 3, wherein the melting temperature (temperature having a viscosity of $10^2$ poise) of the glass composition is 1,550° C. or lower, the working temperature (temperature having a viscosity of $10^4$ poise) is 1,100° C. or lower, and a liquidus temperature is the working temperature or lower.

12. The glass substrate for magnetic recording medium as claimed in claim 11, wherein a melting temperature (temperature having a viscosity of $10^2$ poise) of the glass composition is 1,540° C. or lower, a working temperature (temperature having a viscosity of $10^4$ poise) is 1,055° C. or lower, and a liquidus temperature is the working temperature or lower.

13. The glass substrate for magnetic recording medium as claimed in claim 1, which has a composition of, in % by weight:
61–70% $SiO_2$,
9–18% $Al_2O_3$,
2–4.1% $Li_2O$,
6–13% $Na_2O$,
0–5% $K_2O$,
10–16% $R_2O$
with the proviso of $R_2O=Li_2O+Na_2O+K_2O$,
0–3.5% MgO,
1–7% CaO,
0–2% SrO,
0–2% BaO,
2–10% RO
with the proviso of RO=MgO+CaO+SrO+BaO,
0–2% $TiO_2$,
0–2% $CeO_2$,
0–2% $Fe_2O_3$, and
0–1% MnO,
with the proviso of $TiO_2+CeO_2+Fe_2O_3+MnO=0.01-3\%$.

* * * * *